UNITED STATES PATENT OFFICE.

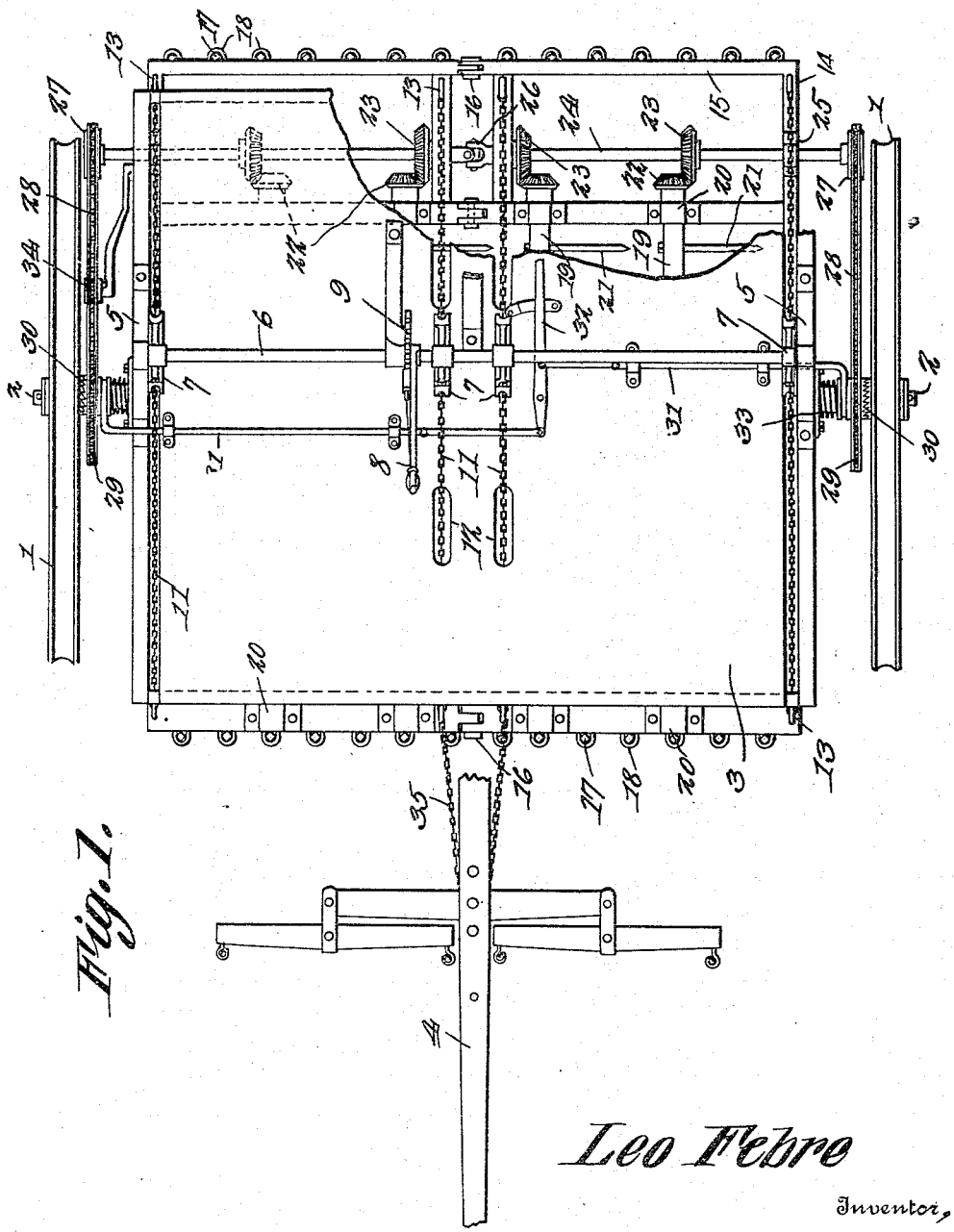

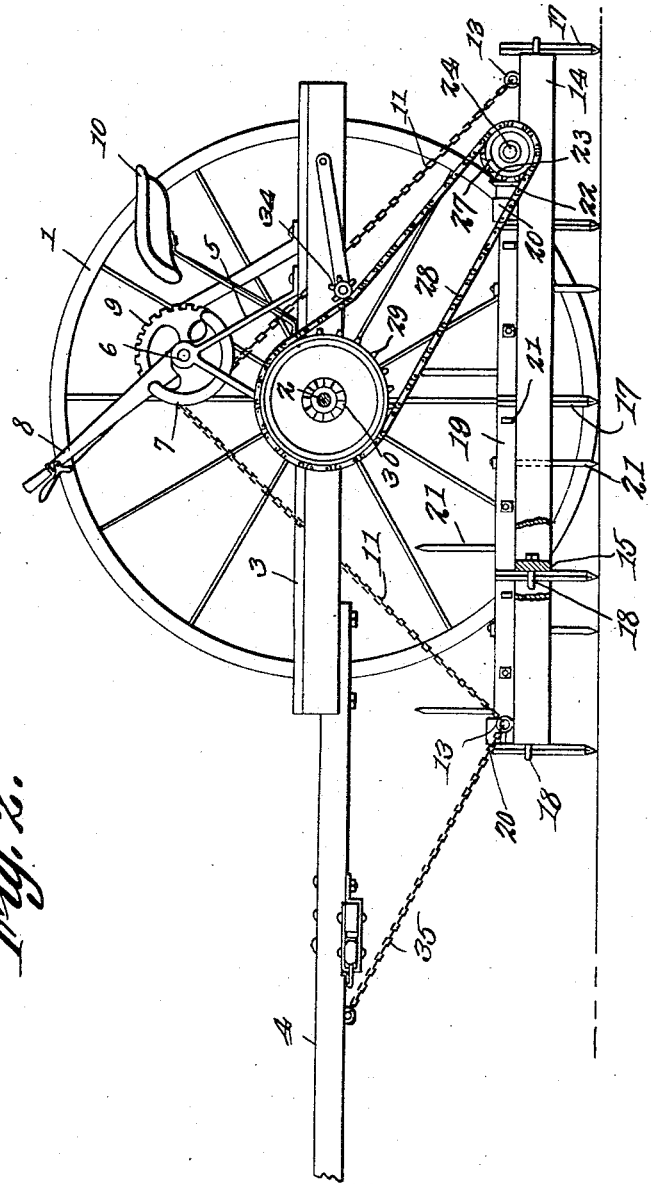

LEO FEBRE, OF NORFOLK, VIRGINIA.

HARROW.

1,285,089.

Specification of Letters Patent.

Patented Nov. 19, 1918.

Application filed February 26, 1918. Serial No. 219,266.

*To all whom it may concern:*

Be it known that I, LEO FEBRE, a citizen of the United States, residing at Norfolk, in the county of Norfolk and State of Virginia, have invented a new and useful Harrow, of which the following is a specification.

The subject of this invention is a harrow in which rotary and stationary teeth coöperate, and the objects of the invention are, first, to produce a harrow which will cut the soil crosswise of its travel, second, to provide means for hanging the harrow from a supporting frame, third, to provide a simple, durable and efficient harrow.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

A practical embodiment of the invention is shown in the accompanying drawings, wherein:—

Figure 1 is a plan view of a harrow constructed in accordance with the invention, a portion being broken away;

Fig. 2 is a side elevation; a portion broken away.

Referring to the drawings by numerals of reference:—

In carrying out the invention, supporting wheels 1 are provided which are journaled on the ends of an axle 2. A suitable platform 3 is mounted on the axle to the forward end of which platform is secured a tongue 4 to which horses may be hitched in the usual way for drawing the structure over a field.

Standards 5 are bolted or otherwise secured to the platform 3 from which they rise and in these standards the ends of a transverse shaft 6 are journaled. Grooved segmental crank plates 7 are rigid on the shaft 6, and a lever arm 8 extends radially from the shaft and may be swung to rock the shaft, a segmental rack 9 being provided to receive the dog of the lever and lock the shaft in its rocked position. A seat 10 may be provided upon the platform in position to permit the operator to easily reach the lever 8.

Chains or cables 11 are made fast in any suitable manner to the segmental crank plate 7 from which they depend forwardly and rearwardly passing where necessary through slots 12 formed in the platform 3. The lower ends of these chains are linked to eye bolts 13 which are secured to the rear and forward portion of the frame work of the harrow.

The harrow comprises side bars 14 and a series of transverse bars 15 which are suitably connected to the side bars. These transverse bars are jointed or pivoted as at 16 to permit the harrow to bend to conform to some extent to the unevenness of the ground over which it is passing. Teeth 17 are spaced along each bar 15 to which they are fastened by U-bolts 18 or in any other suitable manner.

Arranged longitudinally of the harrow frame are rotary shafts 19, here shown as four, which are journaled in boxes 20, secured to the frame. These shafts have spaced radially extending blades 21 secured thereto which blades are adapted to cut the soil transversely of the direction of travel when the shafts 19 are being revolved.

To the rear ends of the shafts 19 beveled gears 22 are rigidly attached, which gears mesh with the beveled gears 23, mounted on a transverse shaft 24 which is journaled in boxes 25 on the frame of the harrow. The shaft 24 has a universal joint 26 at its longitudinal center to permit the shaft to bend with the bending of the harrow frame.

Fast on each end of the shaft 24 is a sprocket wheel 27 over which passes a sprocket chain 28 which chain also passes over a sprocket wheel 29 loosely mounted on the axle 2.

One element of a clutch 30 is secured to each sprocket wheel 29 while its complemental element is rigid on each wheel 1. The yoke ends of rods 31 engage the groove of the hubs of sprocket wheels 29 for the purpose of throwing the sprockets to engage or release the clutches. A lever 32, pivotally secured on the platform 3 is operated for the purpose of throwing these clutches. Compression springs 33 may surround the axle 2 for the purpose of retaining the clutches in engagement.

To keep the sprocket chain tight on the sprocket wheels during all positions of the harrow, a guide sprocket may be secured at each side of the platform 3 and in position to engage the top of the upper flight of the chain.

Draft chains 35 are secured to the tongue 4 and diverge downwardly and rearwardly and are linked to the eye bolts 13 or other securing elements. The object of these chains is to maintain the harrow in proper position.

The foregoing description is thought to clearly define the operation of the device without a further and special explanation thereof.

Having thus described the invention, what is claimed as new and sought by Letters Patent, is:—

1. The combination with a wheel supported frame, of a harrow swung beneath the frame and including jointed transverse bars, spaced teeth secured to the bars, rotatable shafts journaled in the transverse bars and extending longitudinally of the harrow, spaced teeth secured to the shafts, and means for rotating the shafts.

2. The combination with a wheel supported frame, of a harrow swung beneath the frame and comprising longitudinal bars, transverse bars between the longitudinal bars, the said transverse bars jointed, spaced teeth secured to the transverse bars, shafts journaled in the transverse bars and extending longitudinally of the harrow, spaced teeth on the shafts, a shaft journaled in the longitudinal bars and extending transversely of the harrow, and gearing between the shaft and the longitudinal shafts, and means driven by the wheels for driving the transverse shaft.

In testimony that I claim the foregoing as my own I have hereto affixed my signature in the presence of two witnesses.

LEO FEBRE.

Witnesses:
R. M. PARKER,
MASON B. LAWTON.

Copies of this patent may be obtained for five cents each, by addressing the "Commissioner of Patents, Washington, D. C."